(No Model.)
I. SNARE.
GRAIN CLEANER.
No. 257,190. Patented May 2, 1882.
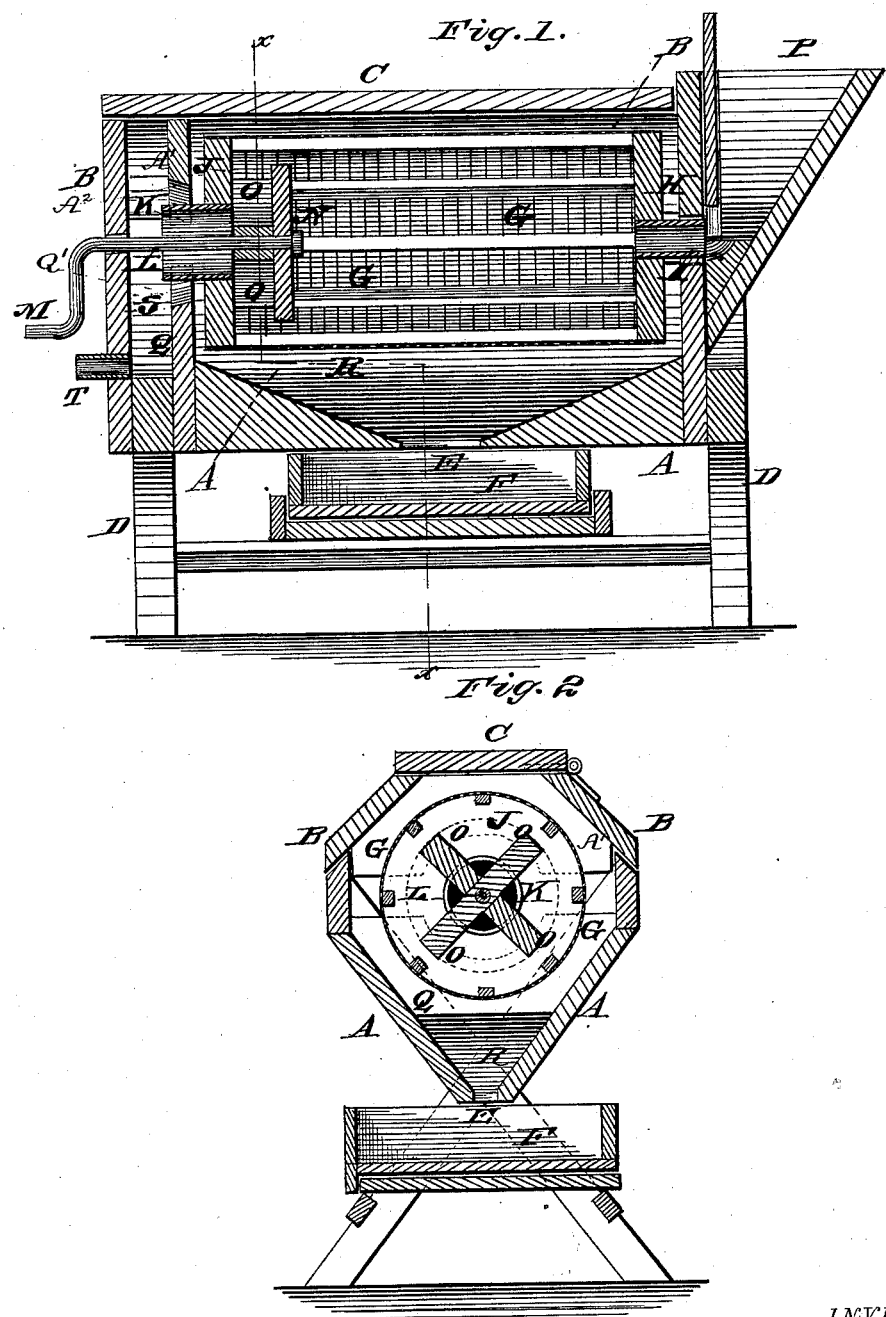

UNITED STATES PATENT OFFICE.

ISAAC SNARE, OF RICHWOOD, OHIO.

GRAIN-CLEANER.

SPECIFICATION forming part of Letters Patent No. 257,190, dated May 2, 1882.

Application filed January 17, 1882. (No model.)

*To all whom it may concern:*

Be it known that I, ISAAC SNARE, of Richwood, in the county of Union and State of Ohio, have invented certain new and useful Improvements in Grain-Cleaners; and I do hereby declare that the following is a full, clear, and exact description of the invention, which will enable others skilled in the art to which it appertains to make and use the same, reference being had to the accompanying drawings, which form a part of this specification.

Figure 1 is a longitudinal sectional view of my improved grain-cleaner, and Fig. 2 is a vertical cross-section on the line $x\ x$, Fig. 1.

Similar letters of reference indicate corresponding parts in both figures.

This invention relates to machines or devices for cleaning grain; and it consists in certain improvements in the construction of the same which will be hereinafter fully described, and particularly pointed out in the claim.

In the drawings hereto annexed, A represents a trough or hopper, which forms the lower part of the frame or casing, the removable upper part of which, B, is provided with a hinged lid or cover, C. The trough or hopper A, which may be supported upon legs D, has slanting sides and ends, which lead to a central opening, E, below which a box or other receptacle, F, may be arranged, as shown.

G is a cylindrical screen, one end of which, H, is provided with a tubular spindle, I, while the other end, J, has a tubular discharge-spout, K, through which passes a spindle or shaft, L, having crank or handle M. The spindle L is secured to a disk, N, arranged in the screen near the end J, between which and said disk radial arms or lifting-buckets O are interposed, and by which the said disk N is secured to the end of the screen.

The trough A is provided at one end with a hopper, P, arranged to feed the grain to be cleaned through the tubular spindle I into the screen. Near its other end the trough A has a partition, Q, dividing said trough into a large and a small compartment, R S, the former of which receives the impurities sifted through the screen, which are discharged through the opening E, while the latter receives the clean grain discharged through the spout K, which grain passes through a spout, T, in the end of the trough A into a suitably-arranged receptacle. The partition Q is provided in its upper edge with a semicircular recess, Q', and above this partition is arranged a similar partition, A', secured to the removable top or upper portion, B, and having a corresponding semicircular recess, A². The tubular discharge-spout K of the screen turns in these recesses, and the object of this formation is that when the top or upper portion, B, is removed it carries with it the upper partition, A', so that the screen may be readily removed from the box for cleaning or other purposes without separating it from the spout K.

From the foregoing description, taken in connection with the drawings hereto annexed, the operation of my invention will be readily understood. The grain to be cleaned passes from hopper P through the tubular spindle I into the screen, which is revolved by means of the handle or crank M, suitable bearings being provided for the spindles in the ends of trough A. The cheat, cockle, cut grain, and other impurities, as well as the inferior grain, pass through the screen, which is constructed so as to retain only the best grain for seeding and other purposes. Said grain passes to the end of the screen, where the radial arms O serve to lift and discharge it through the spout K.

This improved device for cleaning grain is simple, efficient, inexpensive, and may be easily operated.

I am aware that the screen, feeding, and exit mechanism herein described is old, and such I do not claim as my invention, which consists in the improved arrangement and construction of the partitions Q and A' on the parts A B, for the purpose specified.

Having thus described my invention, I claim and desire to secure by Letters Patent of the United States—

The combination, with the bottom portion, A, having the end partition, Q, provided in its upper edge with a semicircular recess, Q', of the removable top or upper portion, B, having the partition A', provided in its lower edge with a semicircular recess A², and the screen G, having the tubular discharge-spout K turning in recesses Q' A², all arranged and operating substantially as and for the purpose specified.

In testimony that I claim the foregoing as my own I have hereto affixed my signature in the presence of two witnesses.

ISAAC SNARE.

Witnesses:
S. S. GARDINER,
J. M. SANDERS.